United States Patent
Kontomaris

(10) Patent No.: US 9,217,100 B2
(45) Date of Patent: Dec. 22, 2015

(54) CHILLER APPARATUS CONTAINING TRANS-1,1,1,4,4,4-HEXAFLUORO-2-BUTENE AND METHODS OF PRODUCING COOLING THEREIN

(75) Inventor: Konstantinos Kontomaris, Wilmington, DE (US)

(73) Assignee: THE CHEMOURS COMPANY FC, LLC, Wilmington, DE (US)

(*) Notice: Subject to any disclaimer, the term of this patent is extended or adjusted under 35 U.S.C. 154(b) by 748 days.

(21) Appl. No.: 13/394,406

(22) PCT Filed: Sep. 15, 2010

(86) PCT No.: PCT/US2010/048910
§ 371 (c)(1),
(2), (4) Date: Mar. 6, 2012

(87) PCT Pub. No.: WO2011/034904
PCT Pub. Date: Mar. 24, 2011

(65) Prior Publication Data
US 2012/0159976 A1    Jun. 28, 2012

Related U.S. Application Data

(60) Provisional application No. 61/242,873, filed on Sep. 16, 2009.

(51) Int. Cl.
*C09K 5/04* (2006.01)
(52) U.S. Cl.
CPC ........... *C09K 5/045* (2013.01); *C09K 2205/126* (2013.01)

(58) Field of Classification Search
CPC ................................................. C09K 2205/126
USPC ......................................... 62/114; 165/104.27
See application file for complete search history.

(56) References Cited

U.S. PATENT DOCUMENTS

| | | | |
|---|---|---|---|
| 5,254,280 A | | 10/1993 | Thomas et al. |
| 5,662,825 A | * | 9/1997 | Bivens et al. ............... 252/67 |

(Continued)

FOREIGN PATENT DOCUMENTS

| | | |
|---|---|---|
| EP | 0 670 295 A1 | 9/1995 |
| WO | 2007/053697 A2 | 5/2007 |

(Continued)

OTHER PUBLICATIONS

PCT International Search Report and Written Opinion mailed Dec. 9, 2010.

(Continued)

*Primary Examiner* — Emmanuel Duke

(57) ABSTRACT

Disclosed herein is a chiller apparatus containing refrigerant characterized by said refrigerant being HFO-1336mzz that is trans isomer or primarily trans isomer. These chillers may be flooded evaporators or direct expansion evaporators, which utilize either centrifugal or screw compressors. Also disclosed herein are methods for producing cooling comprising evaporating trans-HFO-1336mzz in an evaporator in the vicinity of a body to be cooled, thereby producing cooling. Also disclosed herein is a method for replacing HFC-236fa or CFC-114 refrigerant in a chiller apparatus, said method comprising providing HFO-1336mzz to said chiller apparatus in place of the replaced refrigerant; wherein said HFO-1336mzz is trans isomer or primarily trans isomer.

6 Claims, 2 Drawing Sheets

(56) References Cited

U.S. PATENT DOCUMENTS

| | | |
|---|---|---|
| 7,210,301 B2 | 5/2007 | Jannick et |
| 8,070,976 B2 | 12/2011 | Nappa et al. |
| 2003/0042463 A1 | 3/2003 | Arman et al. |
| 2004/0089839 A1 | 5/2004 | Thomas et al. |
| 2006/0242985 A1* | 11/2006 | Leck et al. .................. 62/323.1 |
| 2006/0245944 A1 | 11/2006 | Leck et al. |
| 2007/0108403 A1* | 5/2007 | Sievert et al. .................. 252/67 |
| 2009/0012335 A1 | 1/2009 | Nappa et al. |
| 2009/0120619 A1* | 5/2009 | Sievert et al. ............ 165/104.27 |
| 2010/0038583 A1 | 2/2010 | Shimomura et al. |
| 2012/0101177 A1 | 4/2012 | Van Horn et al. |

FOREIGN PATENT DOCUMENTS

| | | | |
|---|---|---|---|
| WO | 2008/134061 A2 | 11/2008 | |
| WO | 2008/154612 A1 | 12/2008 | |
| WO | 2009/059106 A1 | 5/2009 | |
| WO | WO 2009059106 A1 * | 5/2009 | ............... C09K 5/04 |
| WO | 2009/114398 A1 | 9/2009 | |

OTHER PUBLICATIONS

Haaf et al., Refrigeration Technology, Ullmann's Encyclopedia of Industrial Chemistry, Jul. 15, 2000, pp. 1-43, John Wiley & Sons, Inc., Weinheim.

Montzka et al., Scientific Assessment of Ozone Depletion: 2002, Controlled Substances and Other Source Gases, Chapter 1, Section 1.4.4 Ozone Depletion Potential, pp. 1.28 to 1.31, World Meteorological Organization, Geneva, Switzerland.

* cited by examiner

CHILLER APPARATUS CONTAINING TRANS-1,1,1,4,4,4-HEXAFLUORO-2-BUTENE AND METHODS OF PRODUCING COOLING THEREIN

BACKGROUND OF THE INVENTION

1. Field of the Invention

The present disclosure relates to the field of refrigerants for use in air conditioning or refrigeration equipment. In particular, the present disclosure relates to refrigerants for use in chillers, including flooded evaporator chillers or direct expansion chillers.

2. Description of Related Art

Working fluids for various applications are being sought that have little if any environmental impact. The hydrochlorofluorocarbon (HCFC) and hydrofluorocarbon (HFC) working fluids adopted as replacements for chlorofluorocarbon (CFC) working fluids, have lower or no ozone depletion potential (ODP), but have been found to contribute to global warming. Additionally, the HCFCs will finally reach the phase out deadline set by the Montreal Protocol due to ODP. With regulations coming in force soon based on global warming potential, even the HFCs, with zero ODP will likely not be environmentally acceptable working fluids.

Therefore, replacements are sought for the CFCs, HCFCs, and HFCs currently in use as refrigerants, heat transfer fluids, cleaning solvents, aerosol propellants, foam blowing agents and fire extinguishing or suppression agents.

In order to serve as drop-in replacements in existing equipment, replacements must be close to or match the properties of the original working fluid for which the equipment was designed. It would be desirable to identify compositions that provide a balance of properties that will allow replacement of existing refrigerants and also to serve as refrigerants in new equipment designed for similar applications.

In searching for a replacement for 1,1,1,3,3,3-hexafluoropropane (HFC-236fa), and/or 1,2-dichloro-1,1,2,2-tetrafluoroethane (CFC-114) in particular in chiller applications, it would be desirable to consider unsaturated fluorocarbons. The unsaturated fluorocarbons have zero ODP and significantly lower GWP than the existing refrigerants in use today.

SUMMARY OF THE INVENTION

Trans-1,1,1,4,4,4-hexafluoro-2-butene has been found to provide cooling performance within the required parameters (meaning good energy efficiency and reasonable cooling capacity), and to have low GWP, zero ODP, and be non-flammable.

Therefore, in accordance with one embodiment of the present invention, disclosed herein is a chiller apparatus containing refrigerant characterized by said refrigerant being HFO-1336mzz that is trans isomer or primarily trans isomer. The chiller apparatus comprises a compressor for compressing the vapor produced in the evaporator. The compressor may be either a centrifugal or a screw compressor.

In another embodiment, disclosed is a method for producing cooling in a chiller apparatus comprising evaporating trans-HFO-1336mzz in an evaporator in the vicinity of a body to be cooled, thereby producing cooling.

In another embodiment, disclosed is a method for replacing HFC-236fa or CFC-114 refrigerant in a chiller apparatus, said method comprising providing HFO-1336mzz to said chiller apparatus in place of the replaced refrigerant; wherein said HFO-1336mzz is trans isomer or primarily trans isomer.

DETAILED DESCRIPTION OF THE PREFERRED EMBODIMENTS

Figure 1:
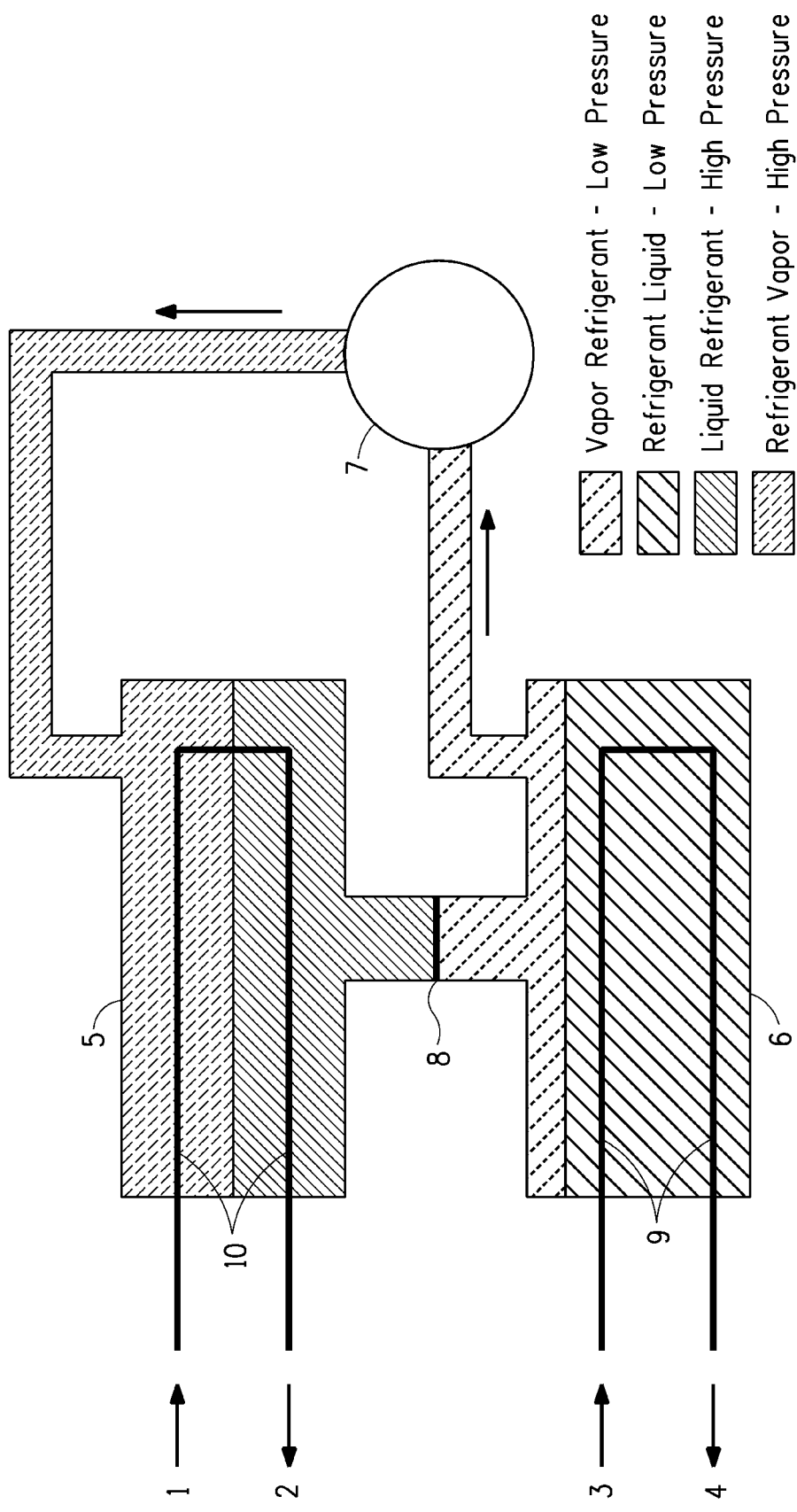
FIG. 1 is a schematic diagram of one embodiment of a flooded evaporator chiller which utilizes trans-HFO-1336mzz.

Before addressing details of embodiments described below, some terms are defined or clarified.

Global warming potential (GWP) is an index for estimating relative global warming contribution due to atmospheric emission of a kilogram of a particular greenhouse gas compared to emission of a kilogram of carbon dioxide. GWP can be calculated for different time horizons showing the effect of atmospheric lifetime for a given gas. The GWP for the 100 year time horizon is commonly the value referenced.

Ozone depletion potential (ODP) is defined in "The Scientific Assessment of Ozone Depletion, 2002, A report of the World Meteorological Association's Global Ozone Research and Monitoring Project," section 1.4.4, pages 1.28 to 1.31 (see first paragraph of this section). ODP represents the extent of ozone depletion in the stratosphere expected from a compound on a mass-for-mass basis relative to fluorotrichloromethane (CFC-11).

Refrigeration capacity (sometimes referred to as cooling capacity) is a term to define the change in enthalpy of a refrigerant in an evaporator per pound of refrigerant circulated, or the heat removed by the refrigerant in the evaporator per unit volume of refrigerant vapor exiting the evaporator (volumetric capacity). The refrigeration capacity is a measure of the ability of a refrigerant or heat transfer composition to produce cooling. Therefore, the higher the volumetric capacity, the greater the cooling that is produced. Cooling rate refers to the heat removed by the refrigerant in the evaporator per unit time.

Coefficient of performance (COP) is the amount of heat removed divided by the required energy input to operate the cycle. The higher the COP, the higher the energy efficiency. COP is directly related to the energy efficiency ratio (EER), that is, the efficiency rating for refrigeration or air conditioning equipment at a specific set of internal and external temperatures.

As used herein, a heat transfer system may be any refrigeration system, refrigerator, air conditioning system, air conditioner, heat pump, chiller, and the like utilizing a heat transfer composition.

As used herein, a heat transfer composition, heat transfer fluid or cooling medium comprises a composition used to carry heat from a heat source to a heat sink or to transfer cooling from a chiller to a body to be cooled.

As used herein, a refrigerant comprises a compound or mixture of compounds that function as a heat transfer composition in a cycle wherein the composition undergoes a phase change from a liquid to a vapor and back in a repeating cycle.

Flammability is a term used to mean the ability of a composition to ignite and/or propagate a flame. For refrigerants and other heat transfer compositions, the lower flammability limit ("LFL") is the minimum concentration of the heat transfer composition in air that is capable of propagating a flame through a homogeneous mixture of the composition and air under test conditions specified in ASTM (American Society of Testing and Materials) E681-2001. The upper flammability limit ("UFL") is the maximum concentration of the heat transfer composition in air that is capable of propagating a flame through a homogeneous mixture of the composition and air as determined by ASTM E-681. For a single component refrigerant or an azeotropic refrigerant blend, the composition will not change during a leak and therefore composition change during leaks will not be a factor in determining flammability. For many refrigeration and air conditioning applications, the refrigerant or working fluid is required to be non-flammable.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Unless otherwise defined, all technical and scientific terms used herein have the same meaning as commonly understood by one of ordinary skill in the art to which this invention belongs. Although methods and materials similar or equivalent to those described herein can be used in the practice or testing of embodiments of the present invention, suitable methods and materials are described below. All publications, patent applications, patents, and other references mentioned herein are incorporated by reference in their entirety, unless a particular passage is cited. In case of conflict, the present specification, including definitions, will control. In addition, the materials, methods, and examples are illustrative only and not intended to be limiting.

The present disclosure provides methods for producing cooling in a chiller apparatus utilizing trans-1,1,1,4,4,4-hexafluoro-2-butene as refrigerant. Trans-1,1,1,4,4,4-hexafluoro-2-butene has been found to provide cooling performance in chillers within the required parameters (meaning good energy efficiency and reasonable cooling capacity), and to have low GWP, zero ODP, and be non-flammable.

Trans-1,1,1,4,4,4-hexafluoro-2-butene, also known as trans-HFO-1336mzz may be made by methods known in the art, such as described in U.S. Patent Application Publication No. US 2009/0012335 A1, by hydrodechlorination of 2,3-dichloro-1,1,1,4,4,4-hexafluoro-2-butene.

HFO-1336mzz exists as one of two configurational isomers, cis- (also sometimes referred to as Z-isomer) and trans- (also referred to as E-isomer). In samples of either "pure" isomer, there will exist some level of the other isomer. As used herein, trans-HFO-1336mzz is intended to refer to the pure trans-isomer and any mixture of the two configuration isomers that is primarily trans-HFO-1336mzz, with the majority of the remainder of the composition comprising cis-HFO-1336mzz. By a mixture that is primarily trans-HFO-1336mzz is meant a mixture of cis-HFO-1336mzz and trans-HFO-1336mzz, wherein the trans-HFO-1336mzz comprises at least 50 weight percent of the composition. Of particular note, is HFO-1336mzz that is essentially the trans isomer, such that it functions in chiller system applications equivalently or substantially equivalently to the pure trans isomer.

In one embodiment, trans-HFO-1336mzz as disclosed herein may be used in combination with a desiccant in a chiller, to aid in removal of moisture. Desiccants may be composed of activated alumina, silica gel, or zeolite-based molecular sieves. Representative molecular sieves include MOLSIV XH-7, XH-6, XH-9 and XH-11 (UOP LLC, Des Plaines, Ill.).

In one embodiment, trans-HFO-1336mzz as disclosed herein may be used in combination with at least one lubricant selected from the group consisting of polyalkylene glycols, polyol esters, polyvinylethers, mineral oils, alkylbenzenes, synthetic paraffins, synthetic napthenes, and poly(alpha)olefins.

In one embodiment, lubricants may comprise those suitable for use with refrigeration or air-conditioning apparatus. Among these lubricants are those conventionally used in vapor compression refrigeration apparatus utilizing chlorofluorocarbon refrigerants. In one embodiment, lubricants comprise those commonly known as "mineral oils" in the field of compression refrigeration lubrication. Mineral oils comprise paraffins (i.e., straight-chain and branched-carbon-chain, saturated hydrocarbons), naphthenes (i.e. cyclic paraffins) and aromatics (i.e. unsaturated, cyclic hydrocarbons containing one or more rings characterized by alternating double bonds). In one embodiment, lubricants comprise those commonly known as "synthetic oils" in the field of compression refrigeration lubrication. Synthetic oils comprise alkylaryls (i.e. linear and branched alkyl alkylbenzenes), synthetic paraffins and naphthenes, and poly(alphaolefins). Representative conventional lubricants are the commercially available BVM 100 N (paraffinic mineral oil sold by BVA Oils), napthenic mineral oil commercially available from Crompton Co. under the trademarks Suniso® 3GS and Suniso® 5GS, naphthenic mineral oil commercially available from Pennzoil under the trademark Sontex® 372LT, napthenic mineral oil commercially available from Calumet Lubricants under the trademark Calumet® RO-30, linear alkylbenzenes commercially available from Shrieve Chemicals under the trademarks Zerol® 75, Zerol® 150 and Zerol® 500, and HAB 22 (branched alkylbenzene sold by Nippon Oil).

In another embodiment, lubricants may also comprise those, which have been designed for use with hydrofluorocarbon refrigerants and are miscible with refrigerants of the present invention under compression refrigeration and air-conditioning apparatus' operating conditions. Such lubricants include, but are not limited to, polyol esters (POEs) such as Castrol® 100 (Castrol, United Kingdom), polyalkylene glycols (PAGs) such as RL-488A from Dow (Dow Chemical, Midland, Mich.), polyvinyl ethers (PVEs), and polycarbonates (PCs).

Lubricants used with trans-HFO-1336mzz are selected by considering a given compressor's requirements and the environment to which the lubricant will be exposed.

In one embodiment, trans-HFO-1336mzz as disclosed herein may further comprise an additive selected from the group consisting of compatibilizers, UV dyes, solubilizing agents, tracers, stabilizers, perfluoropolyethers (PFPE), and functionalized perfluoropolyethers.

In one embodiment, trans-HFO-1336mzz may be used with about 0.01 weight percent to about 5 weight percent of a stabilizer, free radical scavenger or antioxidant. Such other additives include but are not limited to, nitromethane, hindered phenols, hydroxylamines, thiols, phosphites, or lactones. Single additives or combinations may be used.

Optionally, in another embodiment, certain refrigeration or air-conditioning system additives may be added, as desired, to trans-HFO-1336mzz in order to enhance performance and system stability. These additives are known in the field of refrigeration and air-conditioning, and include, but are not limited to, anti wear agents, extreme pressure lubricants, corrosion and oxidation inhibitors, metal surface deactivators, free radical scavengers, and foam control agents. In general, these additives may be present in the inventive compositions in small amounts relative to the overall composition. Typically concentrations of from less than about 0.1 weight percent to as much as about 3 weight percent of each additive are used. These additives are selected on the basis of the individual system requirements. These additives include members of the friaryl phosphate family of EP (extreme pressure) lubricity additives, such as butylated triphenyl phosphates (BTPP), or other alkylated triaryl phosphate esters, e.g. Syn-0-Ad 8478 from Akzo Chemicals, tricresyl phosphates and related compounds. Additionally, the metal dialkyl dithiophosphates (e.g., zinc dialkyl dithiophosphate (or ZDDP), Lubrizol 1375 and other members of this family of chemicals may be used in compositions of the present invention. Other antiwear additives include natural product oils and asymmetrical polyhydroxyl lubrication additives, such as Synergol TMS (International Lubricants). Similarly, stabilizers such as antioxidants, free radical scavengers, and water scavengers may be employed. Compounds in this category can include, but are not limited to, butylated hydroxy toluene (BHT), epoxides, and mixtures thereof. Corrosion inhibitors include dodeceyl succinic acid (DDSA), amine phosphate (AP), oleoyl sarcosine, imidazone derivatives and substituted sulfphonates. Metal surface deactivators include areoxalyl bis (benzylidene) hydrazide (CAS reg no. 6629-10-3), N,N'-bis(3,5-di-tert-butyl-4-hydroxyhydrocinnamoylhydrazine (CAS reg no. 32687-78-8), 2,2,'-oxamidobis-ethyl-(3,5-di-tert-butyl-4-hydroxyhydrocinnamate (CAS reg no. 70331-94-1), N,N'-(disalicyclidene)-1,2-diaminopropane (CAS reg no. 94-91-7) and ethylenediaminetetra-acetic acid (CAS reg no. 60-00-4) and its salts, and mixtures thereof.

Additional additives include stabilizers comprising at least one compound selected from the group consisting of hindered phenols, thiophosphates, butylated triphenylphosphorothionates, organo phosphates, or phosphites, aryl alkyl ethers, terpenes, terpenoids, epoxides, fluorinated epoxides, oxetanes, ascorbic acid, thiols, lactones, thioethers, amines, nitromethane, alkylsilanes, benzophenone derivatives, aryl sulfides, divinyl terephthalic acid, diphenyl terephthalic acid, ionic liquids, and mixtures thereof. Representative stabilizer compounds include but are not limited to butylated hydroxy toluene (BHT), tocopherol; hydroquinone; t-butyl hydroquinone; monothiophosphates; and dithiophosphates, commercially available from Ciba Specialty Chemicals, Basel, Switzerland, hereinafter "Ciba," under the trademark Irgalube® 63; dialkylthiophosphate esters, commercially available from Ciba under the trademarks Irgalube® 353 and Irgalube® 350, respectively; butylated triphenylphosphorothionates, commercially available from Ciba under the trademark Irgalube® 232; amine phosphates, commercially available from Ciba under the trademark Irgalube® 349 (Ciba); hindered phosphites, commercially available from Ciba as Irgafos® 168; a phosphate such as (Tris-(di-tert-butylphenyl), commercially available from Ciba under the trademark Irgafos® OPH; (Di-n-octyl phosphite); and isodecyl diphenyl phosphite, commercially available from Ciba under the trademark Irgafos® DDPP; anisole; 1,4-dimethoxybenzene; 1,4-diethoxybenzene; 1,3,5-trimethoxybenzene; d-limonene; retinal; pinene; menthol; Vitamin A; terpinene; dipentene; lycopene; beta carotene; bornane; 1,2-propylene oxide; 1,2-butylene oxide; n-butyl glycidyl ether; trifluoromethyloxirane; 1,1-bis(trifluoromethyl)oxirane; 3-ethyl-3-hydroxymethyl-oxetane, such as OXT-101 (Toagosei Co., Ltd); 3-ethyl-3-((phenoxy)methyl)-oxetane, such as OXT-211 (Toagosei Co., Ltd); 3-ethyl-3-((2-ethyl-hexyloxy) methyl)-oxetane, such as OXT-212 (Toagosei Co., Ltd); ascorbic acid; methanethiol (methyl mercaptan); ethanethiol (ethyl mercaptan); Coenzyme A; dimercaptosuccinic acid (DMSA); grapefruit mercaptan ((R)-2-(4-methylcyclohex-3-enyl)propane-2-thiol)); cysteine ((R)-2-amino-3-sulfanyl-propanoic acid); lipoamide (1,2-dithiolane-3-pentanamide); 5,7-bis(1,1-dimethylethyl)-3-[2,3(or 3,4)-dimethylphenyl]-2 (3H)-benzofuranone, commercially available from Ciba under the trademark Irganox® HP-136; benzyl phenyl sulfide; diphenyl sulfide; diisopropylamine; dioctadecyl 3,3'-thiodipropionate, commercially available from Ciba under the trademark Irganox® PS 802 (Ciba); didodecyl 3,3'-thiopropionate, commercially available from Ciba under the trademark Irganox® PS 800; di-(2,2,6,6-tetramethyl-4-piperidyl)sebacate, commercially available from Ciba under the trademark Tinuvin® 770; poly-(N-hydroxyethyl-2,2,6,6-tetramethyl-4-hydroxy-piperidyl succinate, commercially available from Ciba under the trademark Tinuvin® 622LD (Ciba); methyl bis tallow amine; bis tallow amine; phenol-alpha-naphthylamine; bis(dimethylamino)methylsilane (DMAMS); tris(trimethylsilyl)silane (TTMSS); vinyltriethoxysilane; vinyltrimethoxysilane; 2,5-difluorobenzophenone; 2',5'-dihydroxyacetophenone; 2-aminobenzophenone; 2-chlorobenzophenone; benzyl phenyl sulfide; diphenyl sulfide; dibenzyl sulfide; ionic liquids; and others.

Ionic liquid stabilizers comprise at least one ionic liquid. Ionic liquids are organic salts that are liquid or have melting points at less than 100° C. In another embodiment, ionic liquid stabilizers comprise salts containing cations selected from the group consisting of pyridinium, pyridazinium, pyrimidinium, pyrazinium, imidazolium, pyrazolium, thiazolium, oxazolium and triazolium; and anions selected from the group consisting of $[BF_4]-$, $[PF_6]-$, $[SbF_6]-$, $[CF_3SO_3]-$, $[HCF_2CF_2SO_3]-$, $[CF_3HFCCF_2SO_3]-$, $[HCClFCF_2SO_3]-$, $[(CF_3SO_2)_2N]-$, $[(CF_3CF_2SO_2)_2N]-$, $[(CF_3SO_2)_3C]-$, $[CF_3CO_2]-$, and F—. Representative ionic liquid stabilizers include emim $BF_4$ (1-ethyl-3-methylimidazolium tetrafluoroborate); bmim $BF_4$ (1-butyl-3-methylimidazolium tetraborate); emim $PF_6$ (1-ethyl-3-methylimidazolium hexafluorophosphate); and bmim $PF_6$ (1-butyl-3-methylimidazolium hexafluorophosphate), all of which are available from Fluka (Sigma-Aldrich).

In one embodiment, the trans-HFO-1336mzz as disclosed herein may be used with a perfluoropolyether additive. A common characteristic of perfluoropolyethers is the presence of perfluoroalkyl ether moieties. Perfluoropolyether is synonymous to perfluoropolyalkylether. Other synonymous terms frequently used include "PFPE", "PFAE", "PFPE oil", "PFPE fluid", and "PFPAE". For example, a perfluoropolyether, having the formula of CF3-(CF2)2-O—[CF(CF3)-CF2-O]j'-R'f, is commercially available from DuPont under the trademark Krytox®. In the formula, j' is 2-100, inclusive and R'f is CF2CF3, a C3 to C6 perfluoroalkyl group, or combinations thereof.

Other PFPEs, commercially available from Ausimont of Milan, Italy, under the trademarks Fomblin® and Galden®, and produced by perfluoroolefin photooxidation, can also be used. PFPE commercially available under the trademark Fomblin®-Y can have the formula of CF3O(CF2CF(CF3)-O-)m'(CF2-O-)n'-R1f. Also suitable is CF3O[CF2CF(CF3)O]m'(CF2CF2O)o'(CF2O)n'-R1f. In the formulae R1f is CF3, C2F5, C3F7, or combinations of two or more thereof; (m'+n') is 8-45, inclusive; and m/n is 20-1000, inclusive; o' is 1; (m'+n'+o') is 8-45, inclusive; m'/n' is 20-1000, inclusive.

PFPE commercially available under the trademark Fomblin®-Z can have the formula of CF3O(CF2CF2-O-)p'(CF2-O)q'CF3 where (p'+q') is 40-180 and p'/q' is 0.5-2, inclusive.

Another family of PFPE, commercially available under the trademark Demnum™ from Daikin Industries, Japan, can also be used. It can be produced by sequential oligomerization and fluorination of 2,2,3,3-tetrafluorooxetane, yielding the formula of F-[(CF2)3-O]t'-R2f where R2f is CF3, C2F5, or combinations thereof and t' is 2-200, inclusive.

The two end groups of the perfluoropolyether, independently, can be functionalized or unfunctionalized. In an unfunctionalized perfluoropolyether, the end group can be branched or straight chain perfluoroalkyl radical end groups. Examples of such perfluoropolyethers can have the formula of $C_{r'}F_{(2r'+1)}$-A-$C_{r'}F_{(2r'+1)}$ in which each r' is independently 3 to 6; A can be O—(CF(CF$_3$)CF$_2$—O)$_{w'}$, O—(CF$_2$—O)$_{x'}$, (CF$_2$CF$_2$—O)$_{y'}$, O—(C$_2$F$_4$—O)$_{w'}$, O—(C$_2$F$_4$—O)$_{x'}$(C$_3$F$_6$—O)$_{y'}$, O—(CF(CF$_3$)CF$_2$—O)$_{x'}$(CF$_2$—O)$_{y'}$, O—(CF$_2$CF$_2$CF$_2$—O)$_{w'}$, O—(CF(CF3)CF2-O)x'(CF2CF2-O)y'-(CF2-O)z', or combinations of two or more thereof; preferably A is O—(CF(CF3)CF2-O)w', O—(C2F4-O)w', O—(C2F4-O)x'(C3F6-O)y', O—(CF2CF2CF2-O)w', or combinations of two or more thereof; w' is 4 to 100; x' and y' are each independently 1 to 100. Specific examples include, but are not limited to, F(CF(CF3)-CF2-O)9-CF2CF3, F(CF(CF3)-CF2-O)9-CF(CF3)2, and combinations thereof. In such PFPEs, up to 30% of the halogen atoms can be halogens other than fluorine, such as, for example, chlorine atoms.

The two end groups of the perfluoropolyether, independently, can also be functionalized. A typical functionalized end group can be selected from the group consisting of esters, hydroxyls, amines, amides, cyanos, carboxylic acids and sulfonic acids.

Representative ester end groups include —COOCH$_3$, —COOCH$_2$CH$_3$, —CF$_2$COOCH$_3$, —CF$_2$COOCH$_2$CH$_3$, —CF$_2$CF$_2$COOCH$_3$, —CF$_2$CF$_2$COOCH$_2$CH$_3$, —CF$_2$CH$_2$COOCH$_3$, —CF$_2$CF$_2$CH$_2$COOCH$_3$, —CF$_2$CH$_2$CH$_2$COOCH$_3$, —CF$_2$CF$_2$CH$_2$CH$_2$COOCH$_3$.

Representative hydroxyl end groups include —CF$_2$OH, —CF$_2$CF$_2$OH, —CF$_2$CH$_2$OH, —CF$_2$CF$_2$CH$_2$OH, —CF$_2$CH$_2$CH$_2$OH, —CF$_2$CF$_2$CH$_2$CH$_2$OH.

Representative amine end groups include —CF$_2$NR$^1$R$^2$, —CF$_2$CF$_2$NR$^1$R$^2$, —CF$_2$CH$_2$NR$^1$R$^2$, —CF$_2$CF$_2$CH$_2$NR$^1$R$^2$, —CF$_2$CH$_2$CH$_2$NR$^1$R$^2$, —CF$_2$CF$_2$CH$_2$CH$_2$NR$^1$R$^2$, wherein R$^1$ and R$^2$ are independently H, CH$_3$, or CH$_2$CH$_3$.

Representative amide end groups include —CF$_2$C(O)NR$^1$R$^2$, —CF$_2$CF$_2$C(O)NR$^1$R$^2$, —CF$_2$CH$_2$C(O)NR$^1$R$^2$, —CF$_2$CF$_2$CH$_2$C(O)NR$^1$R$^2$, —CF$_2$CH$_2$CH$_2$C(O)NR$^1$R$^2$, —CF$_2$CF$_2$CH$_2$CH$_2$C(O)NR$^1$R$^2$, wherein R$^1$ and R$^2$ are independently H, CH$_3$, or CH$_2$CH$_3$.

Representative cyano end groups include —CF$_2$CN, —CF$_2$CF$_2$CN, —CF$_2$CH$_2$CN, —CF$_2$CF$_2$CH$_2$CN, —CF$_2$CH$_2$CH$_2$CN, —CF$_2$CF$_2$CH$_2$CH$_2$CN.

Representative carboxylic acid end groups include —CF$_2$COOH, —CF$_2$CF$_2$COOH, —CF$_2$CH$_2$COOH, —CF$_2$CF$_2$CH$_2$COOH, —CF$_2$CH$_2$CH$_2$COOH, —CF$_2$CF$_2$CH$_2$CH$_2$COOH.

Representative sulfonic acid end groups include —S(O)(O)OR$^3$, —S(O)(O)R$^4$, —CF$_2$O S(O)(O)OR$^3$, —CF$_2$CF$_2$O S(O)(O)OR$^3$, —CF$_2$CH$_2$O S(O)(O)OR$^3$, —CF$_2$CF$_2$CH$_2$O S(O)(O)OR$^3$, —CF$_2$CH$_2$CH$_2$O S(O)(O)OR$^3$, —CF$_2$CF$_2$CH$_2$CH$_2$O S(O)(O)OR$^3$, —CF$_2$ S(O)(O)OR$^3$, —CF$_2$CF$_2$ S(O)(O)OR$^3$, —CF$_2$CH$_2$ S(O)(O)OR$^3$, —CF$_2$CF$_2$CH$_2$ S(O)(O)OR$^3$, —CF$_2$CH$_2$CH$_2$ S(O)(O)OR$^3$, —CF$_2$CF$_2$CH$_2$CH$_2$ S(O)(O)OR$^3$, —CF$_2$O S(O)(O)R$^4$, —CF$_2$CF$_2$O S(O)(O)R$^4$, —CF$_2$CH$_2$O S(O)(O)R$^4$, —CF$_2$CF$_2$CH$_2$O S(O)(O)R$^4$, —CF$_2$CH$_2$CH$_2$O S(O)(O)R$^4$, —CF$_2$CF$_2$CH$_2$CH$_2$O S(O)(O)R$^4$, wherein R$^3$ is H, CH$_3$, CH$_2$CH$_3$, CH$_2$CF$_3$, CF$_3$, or CF$_2$CF$_3$, R$^4$ is CH$_3$, CH$_2$CH$_3$, CH$_2$CF$_3$, CF$_3$, or CF$_2$CF$_3$, R$^4$ is CH$_3$, CH$_2$CH$_3$, CH$_2$CF$_3$, CF$_3$, or CF$_2$CF$_3$.

Chillers

Figure 2:
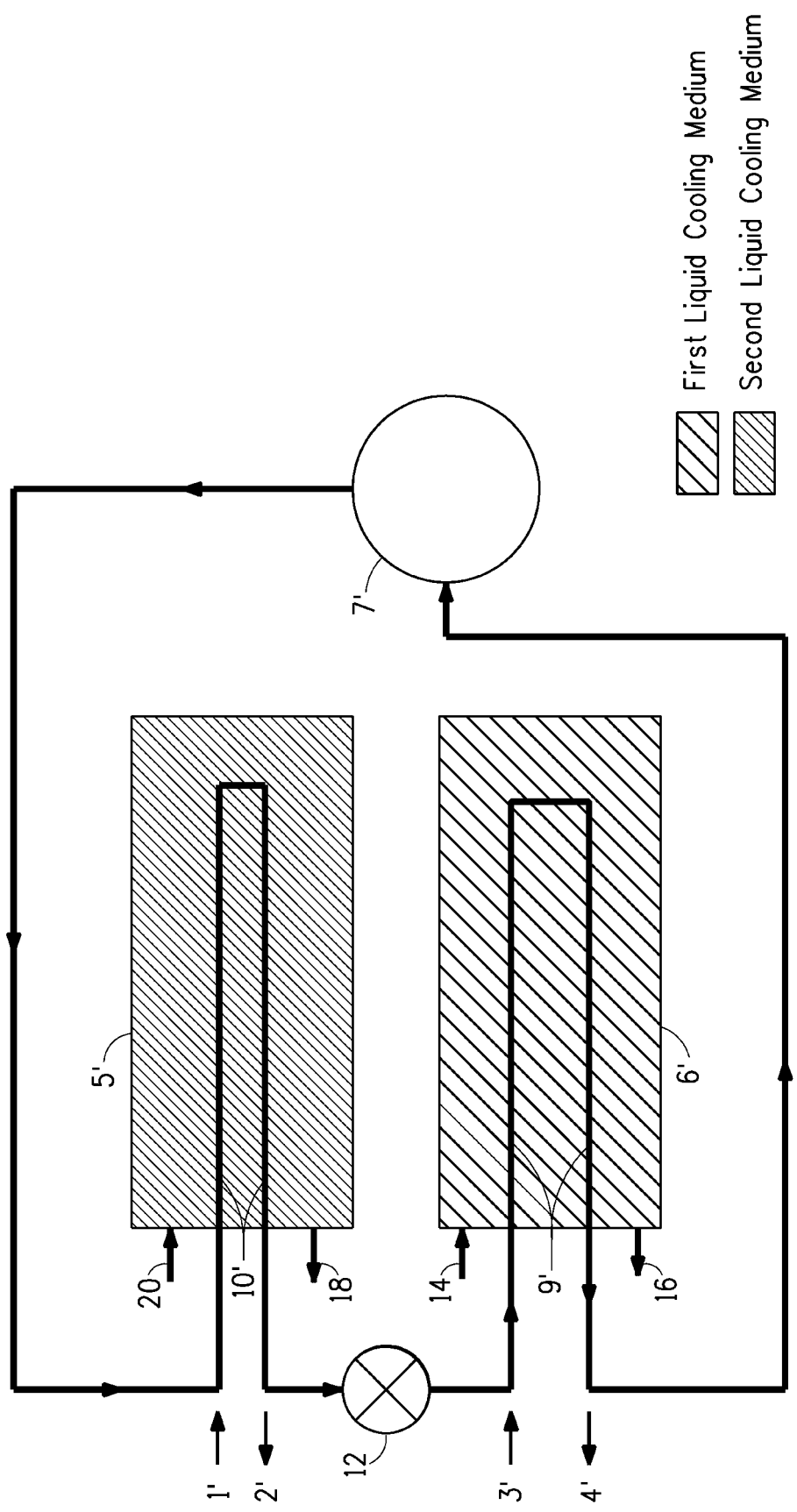
FIG. 2 is a schematic diagram of one embodiment of a direct expansion chiller which utilizes trans-HFO-1336mzz.

In one embodiment is provided a chiller apparatus, alternately referred to herein as a chiller, containing refrigerant characterized by said refrigerant being HFO-1336mzz that is trans isomer or primarily trans isomer containing trans-HFO-1336mzz. The present disclosure is directed to a vapor compression chiller. Such vapor compression chillers may be either a flooded evaporator chiller, which is shown in FIG. 1, or a direct expansion chiller, which is shown in FIG. 2. Both a flooded evaporator chiller and a direct expansion chiller may be air-cooled or water-cooled. In the embodiment where chillers are water cooled, such chillers are generally associated with cooling towers for heat rejection from the system. In the embodiment where chillers are air-cooled, the chillers are equipped with refrigerant-to-air finned-tube condenser coils and fans to reject heat from the system. Air-cooled chiller systems are generally less costly than equivalent-capacity water-cooled chiller systems including cooling tower and water pump. However, water-cooled systems can be more efficient under many operating conditions due to lower condensing temperatures.

Chillers, including both flooded evaporator and direct expansion chillers, may be coupled with an air handling and distribution system to provide comfort air conditioning (cooling and dehumidifying the air) to large commercial buildings, including hotels, office buildings, hospitals, universities and the like. In another embodiment, chillers, most likely air-cooled direct expansion chillers, have found additional utility in naval submarines and surface vessels.

To illustrate how chillers operate, reference is made to the Figures. A water-cooled, flooded evaporator chiller is shown illustrated in FIG. 1. In this chiller a first cooling medium, which is a warm liquid, which comprises water, and, in some embodiments, additives, such as a glycol (e.g., ethylene glycol or propylene glycol), enters the chiller from a cooling system, such as a building cooling system, shown entering at arrow 3, through a coil 9, in an evaporator 6, which has an inlet and an outlet. The warm first cooling medium is delivered to the evaporator, where it is cooled by liquid refrigerant, which is shown in the lower portion of the evaporator. The liquid refrigerant evaporates at a lower temperature than the warm first cooling medium which flows through coil 9. The cooled first cooling medium re-circulates back to the building cooling system, as shown by arrow 4, via a return portion of coil 9. The liquid refrigerant, shown in the lower portion of evaporator 6 in FIG. 1, vaporizes and is drawn into a compressor 7, which increases the pressure and temperature of the refrigerant vapor. The compressor compresses this vapor so that it may be condensed in a condenser 5 at a higher pressure and temperature than the pressure and temperature of the refrigerant vapor when it comes out of the evaporator. A second cooling medium, which is a liquid in the case of a water-cooled chiller, enters the condenser via a coil 10 in condenser 5 from a cooling tower at arrow 1 in FIG. 1. The second cooling medium is warmed in the process and returned via a return loop of coil 10 and arrow 2 to a cooling tower or to the environment. This second cooling medium cools the vapor in the condenser and causes the vapor to condense to liquid refrigerant, so that there is liquid refrigerant in the lower portion of the condenser as shown in FIG. 1. The condensed liquid refrigerant in the condenser flows back to the evaporator through an expansion device 8, which may be an orifice, capillary tube or expansion valve. Expansion device 8 reduces the pressure of the liquid refrigerant, and converts the liquid refrigerant partially to vapor, that is to say that the liquid refrigerant flashes as pressure drops between the condenser and the evaporator. Flashing cools the refrigerant, i.e., both the liquid refrigerant and the refrigerant vapor to the saturated temperature at evaporator pressure, so that both liquid refrigerant and refrigerant vapor are present in the evaporator.

It should be noted that for a single component refrigerant composition, such as trans-HFO-1336mzz, or a composition that is primarily trans-HFO-1336mzz, as in the present invention, the composition of the vapor refrigerant in the evaporator is the same as the composition of the liquid refrigerant in the evaporator. In this case, evaporation will occur at a constant temperature. However, if a refrigerant blend (or mixture) is used, the liquid refrigerant and the refrigerant vapor in the evaporator (or in the condenser) may have different compositions. This may lead to inefficient systems and difficulties in servicing the equipment, thus a single component refrigerant is more desirable.

Chillers with cooling capacities above 700 kW generally employ flooded evaporators, where the refrigerant in the evaporator and the condenser surrounds a coil or other conduit for the cooling medium (i.e., the refrigerant is on the shell side). Flooded evaporators require higher charges of refrigerant, but permit closer approach temperatures and higher efficiencies. Chillers with capacities below 700 kW commonly employ evaporators with refrigerant flowing inside the tubes and cooling medium in the evaporator and the condenser surrounding the tubes, i.e., the cooling medium is on the shell side. Such chillers are called direct-expansion (DX) chillers. A water-cooled direct expansion chiller is illustrated in FIG. 2. In the chiller as illustrated in FIG. 2, first liquid cooling medium, which is a warm liquid, such as warm water, enters an evaporator 6' at inlet 14. Mostly liquid refrigerant (with a small amount of refrigerant vapor) enters a coil 9' in the evaporator at arrow 3' and evaporates, turning to vapor. As a result, first liquid cooling medium is cooled in the evaporator, and a cooled first liquid cooling medium exits the evaporator at outlet 16, and is sent to a body to be cooled, such as a building. In this embodiment of FIG. 2, it is this cooled first liquid cooling medium that cools the building or other body to be cooled. The refrigerant vapor exits the evaporator at arrow 4' and is sent to a compressor 7', where it is compressed and exits as high temperature, high pressure refrigerant vapor. This refrigerant vapor enters a condenser 5' through a condenser coil 10' at 1'. The refrigerant vapor is cooled by a second liquid cooling medium, such as water, in the condenser and becomes a liquid. The second liquid cooling medium enters the condenser through a condenser cooling medium inlet 20. The second liquid cooling medium extracts heat from the condensing refrigerant vapor, which becomes liquid refrigerant, and this warms the second liquid cooling medium in the condenser. The second liquid cooling medium exits through the condenser through the condenser cooling medium outlet 18. The condensed refrigerant liquid exits the condenser through lower coil 10' as shown in FIG. 2 and flows through an expansion device 12, which may be an orifice, capillary tube or expansion valve. Expansion device 12 reduces the pressure of the liquid refrigerant. A small amount of vapor, produced as a result of the expansion, enters the evaporator with liquid refrigerant through coil 9' and the cycle repeats.

Vapor-compression chillers may be identified by the type of compressor they employ. In one embodiment, the trans-HFO-1336mzz is useful in centrifugal chillers, which is a chiller which utilizes a centrifugal compressor, as will be described below. In another embodiment the trans-HFO-1336mzz is useful in positive displacement chillers, which utilize positive displacement compressors, either reciprocating, screw, or scroll compressors. A chiller which utilizes a screw compressor will be hereinafter referred to as a screw chiller.

In one embodiment is provided a centrifugal chiller containing trans-1,1,1,4,4,4-hexafluoro-2-butene. In another embodiment is provided a positive displacement chiller which utilizes a screw compressor containing trans-1,1,1,4, 4,4-hexafluoro-2-butene.

A centrifugal compressor uses rotating elements to accelerate the refrigerant radially, and typically includes an impeller and diffuser housed in a casing. Centrifugal compressors usually take fluid in at an impeller eye, or central inlet of a circulating impeller, and accelerate it radially outward. Some static pressure rise occurs in the impeller, but most of the pressure rise occurs in the diffuser section of the casing, where velocity is converted to static pressure. Each impeller-diffuser set is a stage of the compressor. Centrifugal compressors are built with from 1 to 12 or more stages, depending on the final pressure desired and the volume of refrigerant to be handled.

The pressure ratio, or compression ratio, of a compressor is the ratio of absolute discharge pressure to the absolute inlet pressure. Pressure delivered by a centrifugal compressor is practically constant over a relatively wide range of capacities. The pressure a centrifugal compressor can develop depends on the tip speed of the impeller. Tip speed is the speed of the impeller measured at its tip and is related to the diameter of the impeller and its revolutions per minute. The capacity of the centrifugal compressor is determined by the size of the passages through the impeller. This makes the size of the compressor more dependent on the pressure required than the capacity.

Positive displacement compressors draw vapor into a chamber, and the chamber decreases in volume to compress the vapor. After being compressed, the vapor is forced from the chamber by further decreasing the volume of the chamber to zero or nearly zero.

Reciprocating compressors use pistons driven by a crankshaft. They can be either stationary or portable, can be single or multi-staged, and can be driven by electric motors or internal combustion engines. Small reciprocating compressors from 5 to 30 hp are seen in automotive applications and are typically for intermittent duty. Larger reciprocating compressors up to 100 hp are found in large industrial applications. Discharge pressures can range from low pressure to very high pressure (>5000 psi or 35 MPa).

Screw compressors use two meshed rotating positive-displacement helical screws to force the gas into a smaller space. Screw compressors are usually for continuous operation in commercial and industrial application and may be either stationary or portable. Their application can be from 5 hp (3.7 kW) to over 500 hp (375 kW) and from low pressure to very high pressure (>1200 psi or 8.3 MPa).

Scroll compressors are similar to screw compressors and include two interleaved spiral-shaped scrolls to compress the gas. The output is more pulsed than that of a rotary screw compressor.

For chillers which use scroll compressors or reciprocating compressors, capacities below 150 kW, brazed-plate heat exchangers are commonly used for evaporators instead of the shell-and-tube heat exchangers employed in larger chillers. Brazed-plate heat exchangers reduce system volume and refrigerant charge.

Methods

In one embodiment, a method to produce cooling comprises evaporating trans-HFO-1336mzz in an evaporator in the vicinity of a body to be cooled, thereby producing cooling. This method may also include the steps of compressing said trans-HFO-1336mzz vapor composition produced in the evaporator in a compressor and thereafter condensing said trans-HFO-1336mzz vapor composition in a condenser. The compressor may be either a centrifugal or a screw compressor.

In one embodiment, a body to be cooled may be any space, object or fluid that may be cooled. In one embodiment, a body to be cooled may be a room, building, passenger compartment of an automobile, refrigerator, freezer, or supermarket or convenience store display case. Alternatively, in another embodiment, a body to be cooled may be a cooling medium or heat transfer fluid.

In one embodiment, the method for producing cooling comprises producing cooling in a flooded evaporator chiller as described above with respect to FIG. 1. In this method, trans-HFO-1336mzz is evaporated to form a refrigerant vapor in the vicinity of a first cooling medium. The cooling medium is a warm liquid, such as water, which is transported into the evaporator via a pipe from a cooling system. The warm liquid is cooled and is passed to a body to be cooled, such as a building. The refrigerant vapor is then condensed in the vicinity of a second cooling medium, which is a chilled liquid which is brought in from, for instance, a cooling tower. The second cooling medium cools the refrigerant vapor such that it is condensed to form a liquid refrigerant. In this method, a flooded evaporator chiller may also be used to cool hotels, office buildings, hospitals and universities.

In another embodiment, the method for producing cooling comprises producing cooling in a direct expansion chiller as described above with respect to FIG. 2. In this method, trans-HFO-1336mzz is passed through an evaporator and evaporates to produce a refrigerant vapor. A first liquid cooling medium is cooled by the evaporating refrigerant. The first liquid cooling medium is passed out of the evaporator to a body to be cooled. In this method, the direct expansion chiller may also be used to cool hotels, office buildings, hospitals, universities, as well as naval submarines or naval surface vessels.

In another embodiment, is provided a method for replacing HFC-236fa or CFC-114 refrigerant in a chiller apparatus, said method comprising providing HFO-1336mzz to said chiller apparatus in place of the replaced refrigerant; wherein said HFO-1336mzz is trans isomer or primarily trans isomer.

Refrigerants and heat transfer fluids that are in need of replacement, based upon GWP calculations published by the Intergovernmental Panel on Climate Change (IPCC), include but are not limited to HFC-236fa. Therefore, in accordance with the present invention, there is provided a method for replacing HFC-236fa refrigerant in a chiller with trans-HFO-1336mzz. The method comprises providing trans-HFO-1336mzz to a chiller in place of said refrigerant.

In this method of replacing HFC-236fa, trans-HFO-1336mzz is useful in centrifugal chillers that may have been originally designed and manufactured to operate with HFC-236fa. In another embodiment, trans-HFO-1336mzz is useful in screw chillers that may have been originally designed and manufactured to operate with HFC-236fa.

Another refrigerant in need of replacement due to ODP (ODP=0.94) and GWP (GWP=10,000) is CFC-114. HFC-236fa was originally used in chillers as a replacement for CFC-114. But CFC-114 may still be in use in certain areas of the world. Therefore, in accordance with the present invention, there is provided a method for replacing CFC-114 refrigerant in a chiller with trans-HFO-1336mzz. The method comprises providing trans-HFO-1336mzz to a chiller in place of said refrigerant.

In this method of replacing CFC-114, trans-HFO-1336mzz is useful in centrifugal chillers that may have been originally designed and manufactured to operate with CFC-114. In another embodiment, trans-HFO-1336mzz is useful in screw chillers that may have been originally designed and manufactured to operate with CFC-114.

In replacing CFC-114 or HFC-236fa in existing equipment, additional advantages may be realized by making adjustments to equipment or operating conditions or both. For example, impeller diameter and impeller speed may be adjusted in a centrifugal chiller where trans-HFO-1336mzz is being used as a replacement refrigerant.

Alternatively, in this method of replacing HFC-236fa or CFC-114, trans-HFO-1336mzz as disclosed herein may be useful in new equipment, such as a new flooded evaporator chiller or a new direct expansion chiller. In such new equipment, either a centrifugal compressor or a positive displacement compressor, such as a screw compressor, and the evaporators and condensers used therewith, may be used.

EXAMPLES

Example 1

Cooling Performance for Trans-HFO-1336mzz in a Centrifugal Chiller

Table 1 shows the performance of trans-HFO-1336mzz as compared to CFC-114 and HFC-236fa under conditions typical for a centrifugal chiller. In Table 1, COP is coefficient of performance (analogous to energy efficiency). The data are based on the following conditions.

| Evaporator temperature | 40° F. (4.4° C.) |
|---|---|
| Condenser temperature | 100° F. (37.8° C.) |
| Compressor efficiency is | 70% |

TABLE 1

| | CFC-114 | HFC-236fa | trans-HFO-1336mzz | trans-HFO-1336mzz Relative to CFC-114 (%) | trans-HFO-1336mzz Relative to HFC-236fa (%) |
|---|---|---|---|---|---|
| Evaporator pressure (kPa) | 104.1 | 129 | 89.3 | −14.2 | −30.8 |
| Condenser pressure (kPa) | 316.1 | 406.8 | 298.6 | −5.6 | −26.6 |
| COP | 4.87 | 4.83 | 4.93 | 1.2 | 2 |
| Volumetric Capacity (kJ/m$^3$) | 819.1 | 1035 | 775.7 | −5.3 | −25.1 |

TABLE 1-continued

|  | CFC-114 | HFC-236fa | trans-HFO-1336mzz | trans-HFO-1336mzz Relative to CFC-114 (%) | trans-HFO-1336mzz Relative to HFC-236fa (%) |
|---|---|---|---|---|---|
| Compressor impeller tip speed (m/s) | 144.8 | 155.3 | 154.7 | 6.9 | −0.4 |
| GWP* | 10,000 | 9,810 | 32 | −99.7 | −99.7 |
| ODP** | 0.94 | 0 | 0 | | |

*GWP value for CFC-114 at 100 year time horizon as reported in the IPCC Fourth Assessment Report (2007). GWP value for trans-HFO-1336mzz estimated from atmospheric lifetime predictions.
**ODP value for CFC-114 is reported in the "The Scientific Assessment of Ozone Depletion, 2002, A report of the World Meteorological Association's Global Ozone Research and Monitoring Project," page 1.30, Table 1-5 as determined with updated lifetimes (see footnote a).

The data in Table 1 indicate that trans-HFO-1336mzz generates lower evaporator and condenser pressures than either CFC-114 or HFC-236fa. Therefore, chiller equipment designed to withstand the pressures generated by CFC-114 or HFC-236fa would also withstand the pressures generated by trans-HFO-1336mzz.

The data in Table 1 further indicate that trans-HFO-1336mzz provides, surprisingly, similar energy efficiency (COP) and volumetric cooling capacity to those of CFC-114. Moreover, trans-HFO-1336mzz requires an impeller tip speed to lift the refrigerant from evaporator to condenser conditions comparable to that for CFC-114. As a result, the cost and risk in developing new chiller designs, optimized for the new refrigerant, is reduced. Furthermore, trans-HFO-1336mzz could be used, with small modifications, to replace CFC-114 in existing chillers without an undue deterioration of energy efficiency. Therefore, trans-HFO-1336mzz is an attractive candidate to replace CFC-114 in chillers so as to achieve a significant reduction (99.7%) in the refrigerant GWP.

The data in Table 1 further indicate that trans-HFO-1336mzz provides, surprisingly, a COP slightly better than that of HFC-236fa and requires a compressor impeller tip speed almost identical to that for HFC-236fa. As a result, the cost and risk in developing new chiller designs, optimized for the new refrigerant, is reduced. Furthermore, trans-HFO-1336mzz could be used, with small modifications, to replace HFC-236fa in existing chillers, despite its somewhat lower volumetric cooling capacity, without an undue deterioration of energy efficiency. Therefore, trans-HFO-1336mzz is an attractive candidate to replace HFC-236fa in chillers so as to achieve a significant reduction (99.7%) in GWP.

In one retrofit scenario of an existing chiller, the CFC-114 refrigerant would be replaced by the new refrigerant but the compressor impeller would be retained. In this scenario, a relatively small increase in the rotational speed of the impeller would generate the higher tip speed required to lift the new refrigerant from evaporator to condenser conditions and the higher refrigerant volumetric flow rate required to restore the nominal cooling capacity of the chiller. The compressor efficiency at the new set of operating conditions would not deviate substantially from the compressor efficiency prior to the retrofit. Assuming that the compressor operated at maximum efficiency prior to the retrofit, only a small efficiency loss would have to be accepted in return for the benefits of the new refrigerant at a minimal conversion cost.

Example 2

Non-Flammability Testing

Lack of flammability of trans-HFO-1336mzz is determined according to the ASTM E681-2001 test procedure as required in ASHRAE Standard 34-2007 and described in Addendum p to ASHRAE Standard 34-2007. Test conditions are 60° C. and 100° C., with 50% relative humidity as prepared at 23° C.

Trans-HFO-1336mzz is found to be nonflammable at 60° C. and 100° C. This shows another property of importance to the air conditioning and refrigeration industries. Non-flammable refrigerants are required by many applications. Thus, the nonflammable rating of trans-HFO-1336mzz will allow broad use of trans-HFO-1336mzz.

Example 3

Comparative

Cooling Performance for cis-HFO-1336mzz in a Centrifugal Chiller

Table 2 shows the performance of cis-HFO-1336mzz as compared to CFC-114 and HFC-236fa under conditions typical for a centrifugal chiller. In Table 2, COP is coefficient of performance (analogous to energy efficiency). The data are based on the following conditions.

| Evaporator temperature | 40° F. (4.4° C.) |
|---|---|
| Condenser temperature | 100° F. (37.8° C.) |
| Compressor efficiency is | 70% |

TABLE 2

|  | CFC-114 | HFC-236fa | cis-HFO-1336mzz | cis-HFO-1336mzz Relative to CFC-114 (%) | cis-HFO-1336mzz Relative to HFC-236fa (%) |
|---|---|---|---|---|---|
| Evaporator pressure (kPa) | 104.1 | 129 | 30.7 | −71 | −76 |
| Condenser pressure (kPa) | 316.1 | 406.8 | 119 | −62 | −71 |
| COP | 4.87 | 4.83 | 7.26 | | |
| Volumetric Capacity (kJ/m³) | 819.1 | 1035 | 311 | −62 | −70 |
| Compressor impeller tip speed (m/s) | 144.8 | 155.3 | 187 | 29 | 20 |
| GWP* | 10,000 | 9,810 | <10 | −99.7 | −99.7 |
| ODP** | 0.94 | 0 | 0 | | |

*GWP value for CFC-114 at 100 year time horizon as reported in the IPCC Fourth Assessment Report (2007). GWP value for trans-HFO-1336mzz estimated from atmospheric lifetime predictions.
**ODP value for CFC-114 is reported in the "The Scientific Assessment of Ozone Depletion, 2002, A report of the World Meteorological Association's Global Ozone Research and Monitoring Project," page 1.30, Table 1-5 as determined with updated lifetimes (see footnote a).

The data in Table 2 clearly indicate that the volumetric capacity, at 62% or 70% reduced, as compared to CFC-114 and HFC-236fa, is not adequate for cis-HFO-1336mzz to effectively serve as a retrofit for either CFC-114 or HFC-236fa. By comparison, the trans-HFO-1336mzz can provide much closer values of about 5% or 25% difference compared to CFC-114 and HFC-236fa, respectfully. Additionally, the impeller tip speed needed for cis-HFO-1336mzz is 29 or 20% higher than that for CFC-114 or HFC-236fa, while for trans-HFO-1336mzz, the tip speed is only about 6.9% higher than CFC-114 and almost identical to that for HFC-236fa.

What is claimed is:

1. A chiller apparatus comprising: a compressor for compressing the vapor produced in an evaporator; the chiller apparatus containing refrigerant characterized by said refrigerant being trans-HFO-1336mzz; and wherein said chiller is a flooded evaporator chiller or a direct expansion chiller suitable for use with CFC-114 or HFC-236fa.

2. the chiller apparatus of claim 1; wherein said compressor is a centrifugal compressor or a screw compressor.

3. A method for producing cooling in a chiller apparatus comprising evaporating trans-HFO-1336mzz in an evaporator thereby producing cooling wherein said chiller is suitable for use with CFC-114 or HFC-236fa; and wherein the chiller is selected from the group consisting of flooded evaporator chillers and direct expansion chillers.

4. The method of claim 3, further comprising the step of passing a cooling medium through the evaporator of the chiller apparatus, evaporating the trans-HFO-1336mzz in the evaporator to form a vapor composition thereby cooling the cooling medium, and passing the cooling medium out of the evaporator.

5. The method of claim 4, further comprising the step of compressing the vapor composition in a centrifugal compressor.

6. The method of claim 4, further comprising the step of compressing the vapor composition in a screw compressor.

* * * * *